(12) United States Patent
Huang

(10) Patent No.: US 11,262,632 B2
(45) Date of Patent: Mar. 1, 2022

(54) ACTIVE SWITCH ARRAY SUBSTRATE, MANUFACTURING METHOD THEREOF AND LIQUID CRYSTAL DISPLAY PANEL APPLYING THE SAME

(71) Applicant: HKC Corporation Limited, Shenzhen (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 838 days.

(21) Appl. No.: 16/068,487

(22) PCT Filed: Jan. 24, 2018

(86) PCT No.: PCT/CN2018/073937
§ 371 (c)(1),
(2) Date: Jul. 6, 2018

(87) PCT Pub. No.: WO2019/085292
PCT Pub. Date: May 9, 2019

(65) Prior Publication Data
US 2021/0165256 A1      Jun. 3, 2021

(30) Foreign Application Priority Data
Nov. 3, 2017   (CN) .......................... 201711071436.X

(51) Int. Cl.
*G02F 1/1368* (2006.01)
*G02F 1/1339* (2006.01)
*G02F 1/1362* (2006.01)

(52) U.S. Cl.
CPC ........ *G02F 1/1368* (2013.01); *G02F 1/13396* (2021.01); *G02F 1/136209* (2013.01); *G02F 1/136222* (2021.01)

(58) Field of Classification Search
CPC ................................................ G02F 1/136222
See application file for complete search history.

(56) References Cited

U.S. PATENT DOCUMENTS

2010/0002172 A1*   1/2010   Kim .................... G02F 1/13394
                                                            349/106
2014/0354924 A1*  12/2014   Byun ................. G02F 1/133514
                                                            349/106
(Continued)

FOREIGN PATENT DOCUMENTS

CN        102269834 A      12/2011
CN        106646981 A       5/2017
(Continued)

OTHER PUBLICATIONS

International Search Report dated Jul. 13, 2018, in the corresponding PCT application PCT/CN2018/073937, 11 pages in Chinese, 3 pages in English.

*Primary Examiner* — Alexander P Gross
(74) *Attorney, Agent, or Firm* — Juan Carlos A. Marquez; Marquez IP Law Office, PLLC

(57) ABSTRACT

An active switch array substrate comprises: a first substrate; a first insulation layer disposed on the first substrate; a plurality of active switches disposed on the first insulation layer; a first planarization layer disposed on the first insulation layer and covering the active switches; a color filter layer disposed on the first planarization layer, the color filter layer including a plurality of first photoresist layers, second photoresist layers and third photoresist layers parallel to each other; a plurality of dummy bumps, wherein a material of the dummy bumps is the same as a material of the third photoresist layers, and the dummy bumps are disposed above the first photoresist layers and the third photoresist
(Continued)

layers; and a pixel electrode layer disposed on the color filter layer and covering the dummy bumps.

17 Claims, 11 Drawing Sheets

(56) References Cited

U.S. PATENT DOCUMENTS

| | | | |
|---|---|---|---|
| 2015/0370115 A1* | 12/2015 | Ge | G02F 1/133512 |
| | | | 349/43 |
| 2016/0170253 A1* | 6/2016 | Song | H01L 27/124 |
| | | | 257/72 |
| 2016/0202528 A1 | 7/2016 | Kang et al. | |
| 2018/0203313 A1* | 7/2018 | Wang | G02F 1/136286 |

FOREIGN PATENT DOCUMENTS

| | | |
|---|---|---|
| CN | 107065316 A | 8/2017 |
| CN | 107275288 A | 10/2017 |
| CN | 107608124 A | 1/2018 |
| JP | 2001201750 A | 7/2001 |

* cited by examiner

ACTIVE SWITCH ARRAY SUBSTRATE, MANUFACTURING METHOD THEREOF AND LIQUID CRYSTAL DISPLAY PANEL APPLYING THE SAME

BACKGROUND OF THE INVENTION

Field of Invention

The present invention generally relates to an active switch array substrate and a manufacturing method thereof, and especially to an active switch array substrate, a manufacturing method thereof, and a liquid crystal display panel applying the same.

DESCRIPTION OF RELATED ART

A liquid crystal display apparatus is composed of a color filter (CF) substrate, an active switch array substrate, and liquid crystals filled between the color filter (CF) substrate and the active switch array substrate. A larger liquid crystal display apparatus can further include a plurality of spacers for maintaining a gap between the color filter (CF) substrate and the active switch array substrate. The liquid crystals could be filled by a liquid crystal injection method, especially a liquid crystal vacuum injection method. However, the injection time of the liquid crystal vacuum injection method is very time consuming. Therefore, the liquid crystal vacuum injection method is gradually replaced by a new one drop filling (ODF) method, so that the foregoing spacer structure also needs to be redesigned. Currently, a known technique is introduced to use a kind of spherical spacer structure in liquid crystals. However, the spherical spacer structure is liable to break the substrates when the spherical spacer structure rolls because the substrates are under pressure. Or, the spherical spacer structure is disposed randomly in a pixel region resulting in uneven distribution. Furthermore, a product yield rate is affected because of the light scattering problem of the spherical spacer structure. Therefore, in recent years, a photolithography technique is used to form a spacer (photo spacer, PS) which can precisely control the spacer position, size and height to replace the traditional spherical spacer structure.

In a liquid crystal display (LCD) apparatus, a spacer structure is used for controlling a space between a first substrate (for example, an active switch array substrate) and a second substrate (for example, a color filter substrate). Generally speaking, the space between the first substrate and the second substrate cannot be maintained uniformly without the spacer structure. It is noted that the uniform gap between the two substrates above-mentioned is very important to maintain a good display quality and a good electric signal quality for the liquid crystal display (LCD) apparatus.

In recent years, a manufacturing technique of a liquid crystal display (LCD) is improved constantly, and production costs continue to reduce and yield rates are getting increased for a variety of components of the liquid crystal display (LCD). Therefore, the spacer structure also needs to be changed or improved to follow and correspond to the same innovation and development trend.

SUMMARY OF THE INVENTION

For resolving the technical problems above-mentioned, the objects of the present invention are to provide an active switch array substrate, manufacturing method thereof, and a liquid crystal display panel applying the same. The present invention can increase an amount of liquid crystals and decrease a brightness uneven phenomenon of in a liquid crystal display (LCD) apparatus. The brightness uneven phenomenon will result in a variety of blemish and clouding image effects.

The objects and technical solutions of the present invention can be further implemented by following technical configuration and means. In one perspective, the present active switch array substrate comprises: a first substrate; a first insulation layer disposed on the first substrate; a plurality of active switches disposed on the first insulation layer; a first planarization layer disposed on the first insulation layer and covering the active switches; a color filter layer disposed on the first planarization layer, the color filter layer including a plurality of first photoresist layers, second photoresist layers and third photoresist layers parallel to each other; a plurality of dummy bumps, wherein a material of the dummy bumps is the same as a material of the third photoresist layers, and the dummy bumps are disposed above the first photoresist layers and the third photoresist layers; and a pixel electrode layer disposed on the color filter layer and covering the dummy bumps.

In another perspective, the present manufacturing method of an active switch array comprises: providing a first substrate; forming a first insulation layer on the first substrate; forming a plurality of active switches on the first insulation layer; forming a first planarization layer on the first insulation layer and covering the active switches; sequentially forming a plurality of first photoresist layers and second photoresist layers parallel to each other; simultaneously forming a plurality of third photoresist layers and a plurality of dummy bumps, wherein the third photoresist layers are parallel to the first photoresist layers and the second photoresist layers to form a color filter layer, wherein a material of the dummy bumps is the same as a material of the third photoresist layers, and the dummy bumps are disposed above the first photoresist layers and the second photoresist layers; and forming a pixel electrode layer on the color filter layer and covering the dummy bumps.

In one embodiment of the present invention, an opposite substrate disposed oppositely to the active switch array substrate comprises: a second substrate; an indium tin oxide electrode layer disposed on the second substrate; a black matrix layer disposed on the indium tin oxide electrode layer; and a plurality of primary photo spacers and secondary photo spacers disposed on the black matrix layer, wherein the primary photo spacers contact the pixel electrode layer, and the secondary photo spacers do not contact the pixel electrode layer, wherein the primary photo spacers and the secondary photo spacers are disposed between the opposite substrate and the active switch array substrate to define a liquid crystal space.

In another perspective, the present liquid crystal display panel comprises: an active switch array substrate; an opposite substrate disposed oppositely to the active switch array substrate; and a liquid crystal layer disposed between the active switch array substrate and the opposite substrate. The foregoing active switch array substrate comprises: a first substrate; a first insulation layer disposed on the first substrate; a plurality of active switches disposed on the first insulation layer; a first planarization layer disposed on the first insulation layer and covering the active switches; a color filter layer disposed on the first planarization layer, the color filter layer including a plurality of first photoresist layers, second photoresist layers and third photoresist layers parallel to each other; a plurality of dummy bumps, wherein a material of the dummy bumps is the same as a material of the third photoresist layers, and the dummy bumps are disposed above the first photoresist layers and the third photoresist layers; and a pixel electrode layer disposed on the color filter layer and covering the dummy bumps. The foregoing opposite substrate comprises: a second substrate; an indium tin oxide electrode layer disposed on the second substrate; a black matrix layer disposed on the indium tin oxide electrode layer; and a plurality of primary photo spacers and secondary photo spacers disposed on the black matrix layer, wherein the primary photo spacers contact the pixel electrode layer, and the secondary photo spacers do not contact the pixel electrode layer, wherein the primary photo spacers and the secondary photo spacers are disposed between the opposite substrate and the active switch array substrate to define a liquid crystal space. The foregoing liquid crystal layer is disposed between the active switch array substrate and the opposite substrate and fills the liquid crystal space.

The objects and technical solutions of the present invention can be further implemented by following technical configuration and means.

In one embodiment of the present invention, the material of the dummy bumps is the same as the material of a red photoresist layer, a blue photoresist layer, or a green photoresist layer.

In one embodiment of the present invention, the thickness of the dummy bump is preferably 0.5~0.8 um.

In one embodiment of the present invention, in a manufacturing method of an active switch array substrate, the foregoing step of simultaneously forming a plurality of third photoresist layers and a plurality of dummy bumps comprises: forming a photoresist material layer on the first planarization layer; forming a photomask on the photoresist material layer, the photomask having a translucent region, an opaque region and a half-translucent region; and performing an exposure process and a development process to form the third photoresist layers and the dummy bumps.

In one embodiment of the present invention, in the manufacturing method of the active switch array substrate, the photomask includes a gray-tone photomask and a half-tone photomask.

In one embodiment of the present invention, in the foregoing liquid crystal display panel, the material of the dummy bumps is the same as the material of a red photoresist layer, a blue photoresist layer, or a green photoresist layer.

In one embodiment of the present invention, in the liquid crystal display panel, the thickness of the dummy bump is preferably 0.5~0.8 um.

In one embodiment of the present invention, in the liquid crystal display panel, sizes and heights of the primary photo spacers and the secondary photo spacers are uniform.

The advantages of the present invention include increasing an amount of liquid crystals and decreasing a brightness uneven phenomenon of in a liquid crystal display (LCD) apparatus. The brightness uneven phenomenon will result in a variety of blemish and clouding image effects.

DESCRIPTION OF THE PREFERRED EMBODIMENTS

Figure 1A:
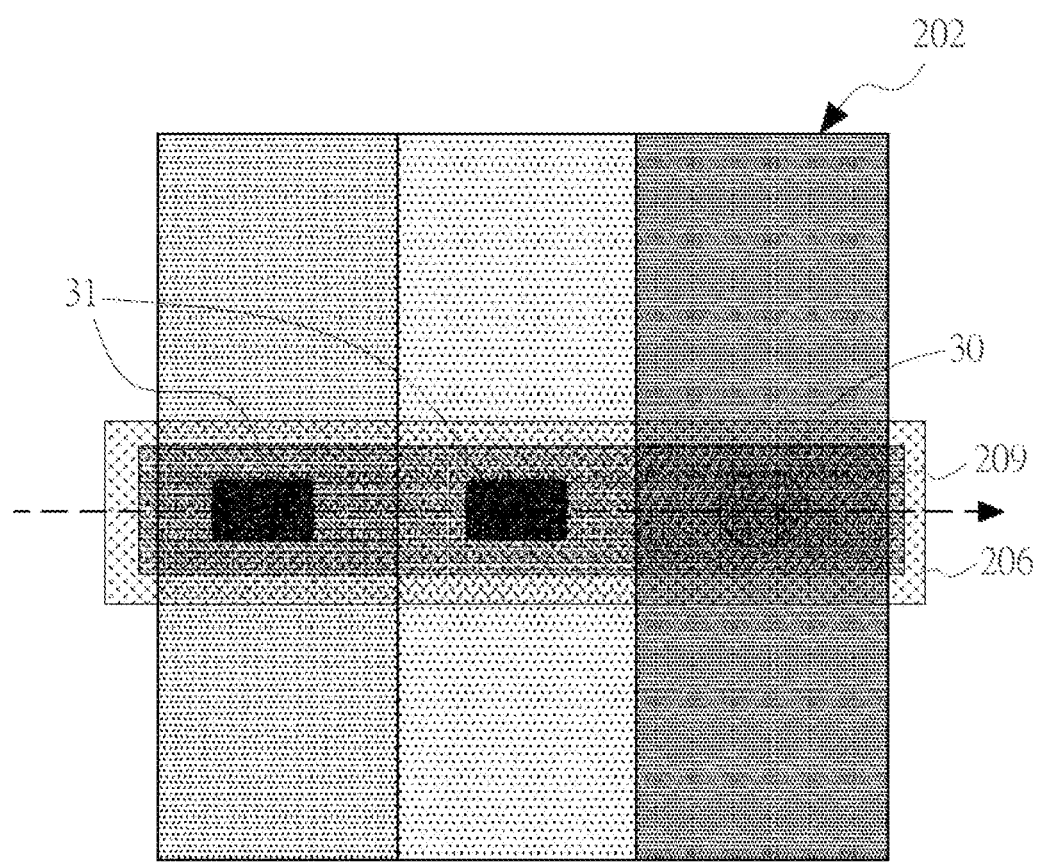
FIG. 1a shows a top view illustrating an example of a spacer position, wherein a color filter layer is disposed on an active switch array substrate in a liquid crystal display (LCD).

The drawings as referred to following embodiments throughout the description of the present invention are examples for implementing the objects of the present invention. The orientation words or terms used in the description of the present invention, such as "above", "under", "forward", "backward", "left", "right", "inner", "outer", and "side". are examples in the drawings for illustrative purpose only, or just show the interrelations between the components, but not to be construed as limitations to the scope of the present invention.

The drawings and the description of the present invention are deemed to be examples but not limitations essentially. In the drawings, components or elements having similar or same structure are marked with the same numbers. In addition, sizes and thicknesses of every component or element are just examples, but not drawn according to the actual scale and not read as limitations to the scope of the present invention.

In drawings of the present invention, sizes and thicknesses of layers, films, panels, or regions are emphasized for clearness, easy to describe and easy to understand. Therefore, some layers, films, or regions are emphasized but not drawn according to their actual scales. It is to be understood that, for example, when one of the components of layers, films, regions, or substrate are "on" another component of layers, films, regions, or substrate, the one of the components of layers, films, regions, or substrate could be adjacent on another component of layers, films, regions, or substrate directly, or there could be other inter-components of layers, films, regions, or substrate disposed therebetween.

Furthermore, in the description of the present invention, a word "comprising" or "including" is construed to comprise or include the related components, but not exclude other components, except there is clearly opposite word or description in the present invention. And, in the description of the present invention, a word "on" can be construed to be above or under a target component, but not only construed to be on a top of the target component in vertical or gravity direction.

For further clarifying the technical solutions or functions of the present invention to implement the objects of the present invention, a backlight module and manufacturing method thereof, and their specific implementations, structures, features and functions, according to a preferred embodiment of the present invention will be apparent from the following detailed description with reference to the accompanying drawings.

The present display panel can include an active switch array (thin film transistor, TFT) substrate, a color filter (CF) layer substrate, and a liquid crystal (LC) layer formed between the two substrates above-mentioned.

In one embodiment of the present invention, the liquid crystal display panel can be a curved display panel.

In one embodiment of the present invention, the active switch array (TFT) and the color filter (CF) layer can be formed on a same substrate.

Figure 1B:
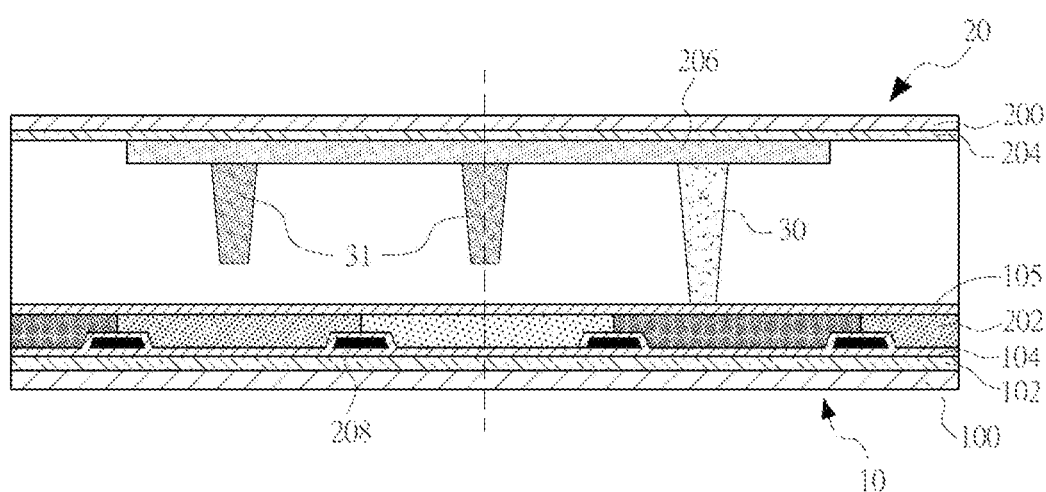
FIG. 1b shows a cross-sectional view illustrating an example of a spacer position, wherein a color filter layer is disposed on an active switch array substrate in a liquid crystal display (LCD).

FIG. 1a shows a top view illustrating an example of a photo spacer position, wherein a color filter layer is disposed on an active switch array substrate. FIG. 1b shows a cross-sectional view illustrating an example of a photo spacer position, wherein a color filter layer is disposed on an active switch array substrate in a liquid crystal display (LCD). Please refer to FIGS. 1a and 1b, in the process of forming an active switch array (TFT) and a color filter (CF) layer on a same substrate, the substrate is usually a planarization design. Relatively, a photo spacer 30 and a photo spacer 31 have a stepped design. The primary photo spacer 30 and the secondary photo spacer 31 can be formed by using a photomask such as a gray tone mask 209 or a half tone mask 209. Therefore, the primary photo spacer 30 and the secondary photo spacer 31 have different areas and heights which bring in poor uniformity of area and height of the photo spacers 30 and 31, so that an arrangement of quantity ratio of the photo spacers 30 and 31 is affected and difficult.

Please continue to refer to FIGS. 1a and 1b, in one embodiment of the present invention, a liquid crystal display panel comprises: an active switch array substrate 10 and an opposite substrate 20. The active switch array substrate 10 includes: a first substrate 100; a first insulation layer 102 disposed on the first substrate 100; a plurality of active switches 208 disposed on the first insulation layer 102; a first planarization layer 104 disposed on the first insulation layer 102 and covering the active switches 208; a color filter layer 202 disposed on the first planarization layer 104, the color filter layer 202 including a first photoresist layer, a second photoresist layer and a third photoresist layer disposed parallel to each other (for example, the color filter layer 202 includes but is not limited to a blue photoresist layer, a green photoresist layer, a red photoresist layer, a white photoresist layer, or yellow photoresist layer); and a pixel electrode layer 105 disposed on the color filter layer 202. The opposite substrate 20 is disposed oppositely to the active switch array substrate 10 and includes: a second substrate 200; an indium tin oxide (ITO) electrode layer 204 disposed on the second substrate 200; a black matrix layer 206 disposed on the indium tin oxide electrode layer 204; a plurality of primary photo spacers 30 and a plurality of secondary photo spacers 31 all disposed on the black matrix layer 206, wherein the primary photo spacers 30 contact the pixel electrode layer 105, and the secondary photo spacers 31 do not contact the pixel electrode layer 105, wherein the primary photo spacers 30 and the secondary photo spacers 31 are disposed between the opposite substrate 20 and the active switch array substrate 10 to define a liquid crystal space; and a liquid crystal layer (not shown) disposed between the active switch array substrate 10 and the opposite substrate 20 to fill the liquid crystal space.

Figure 2A:
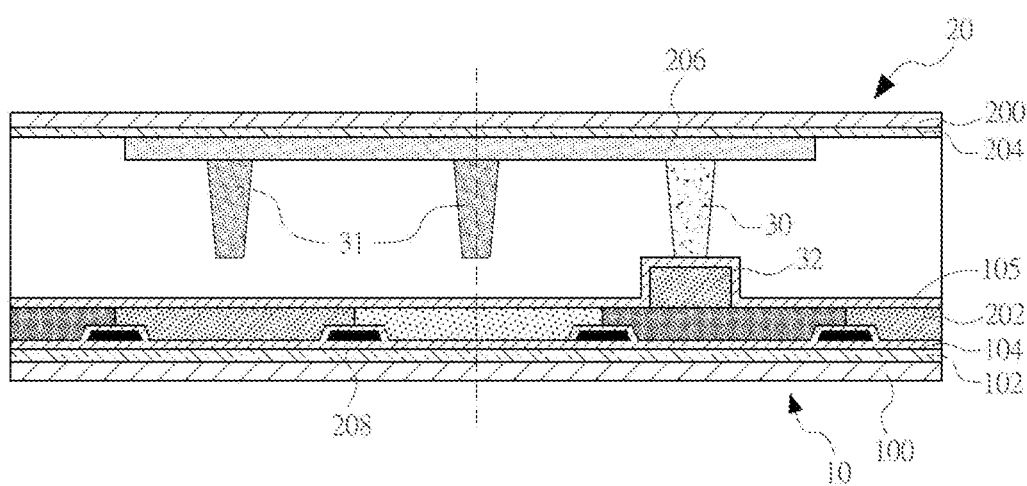
FIG. 2a shows a cross-sectional view illustrating a photoresist dummy bump, wherein a color filter layer is disposed on an active switch array substrate in a liquid crystal display (LCD) according to a manufacturing method of the present invention.
Figure 2B:
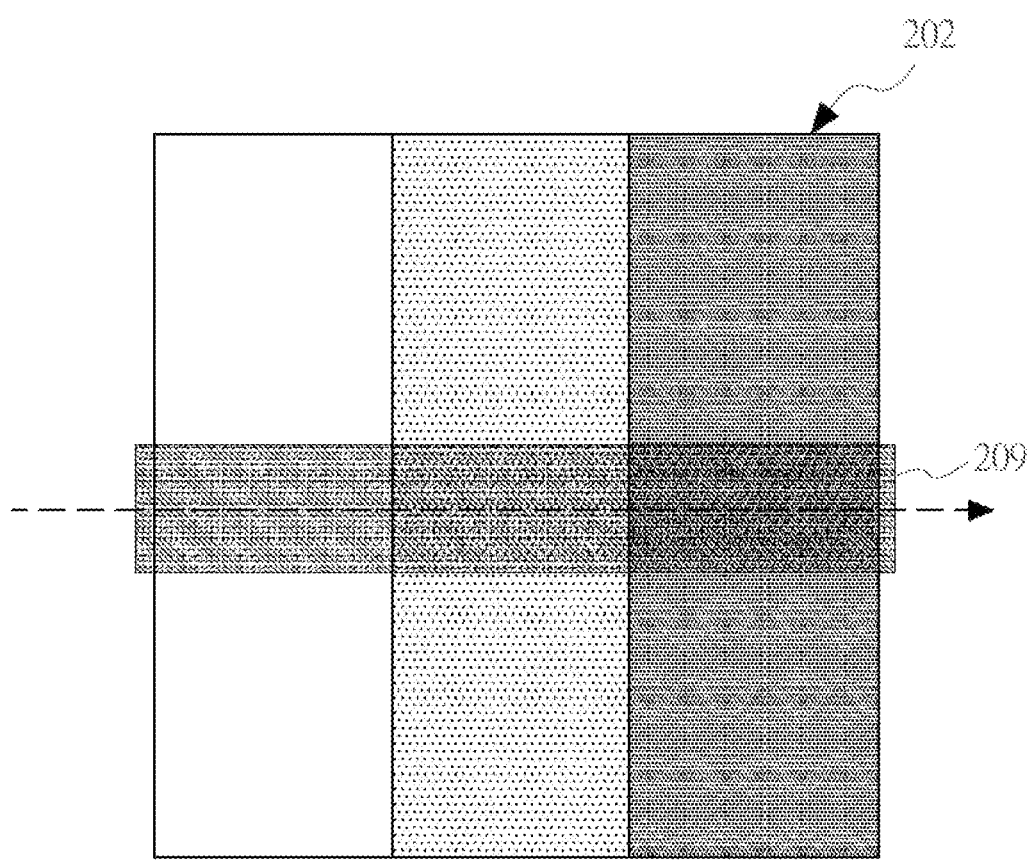
FIG. 2b shows a top view illustrating a process of forming a color filter layer according to a manufacturing method of the present invention.
Figure 2C:
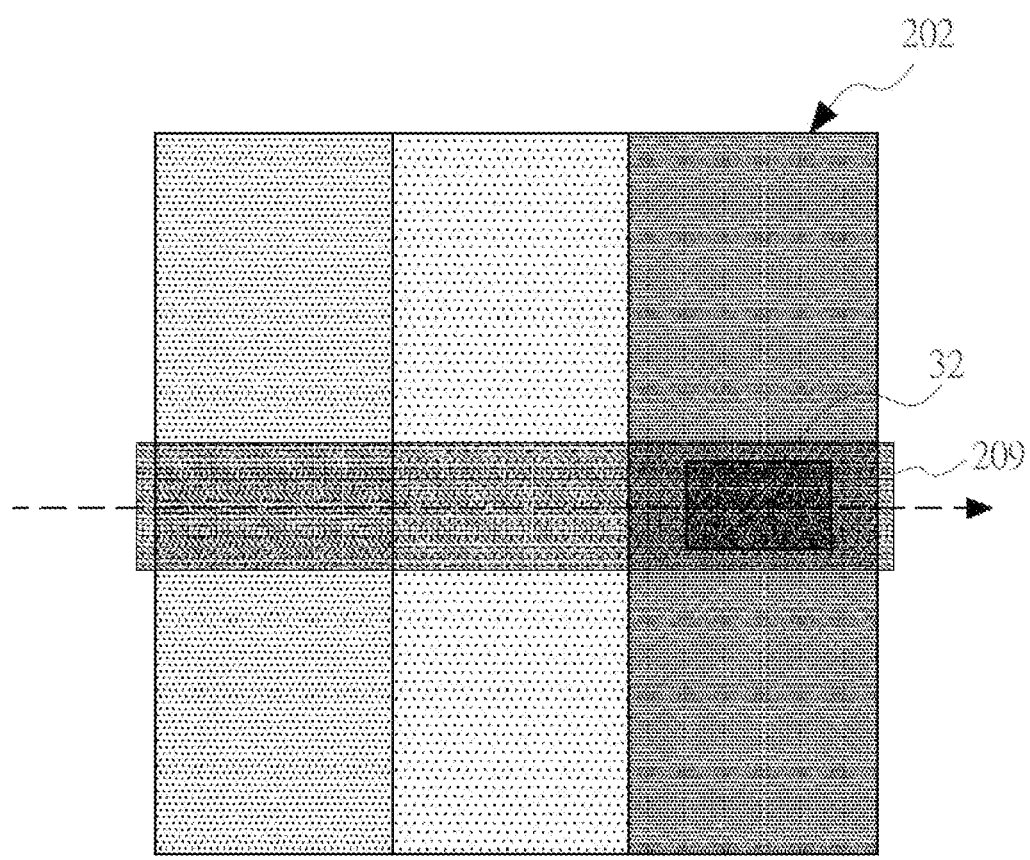
FIG. 2c shows a top view illustrating a halftone mask used for a process of forming a color filter layer according to a manufacturing method of the present invention.
Figure 2D:
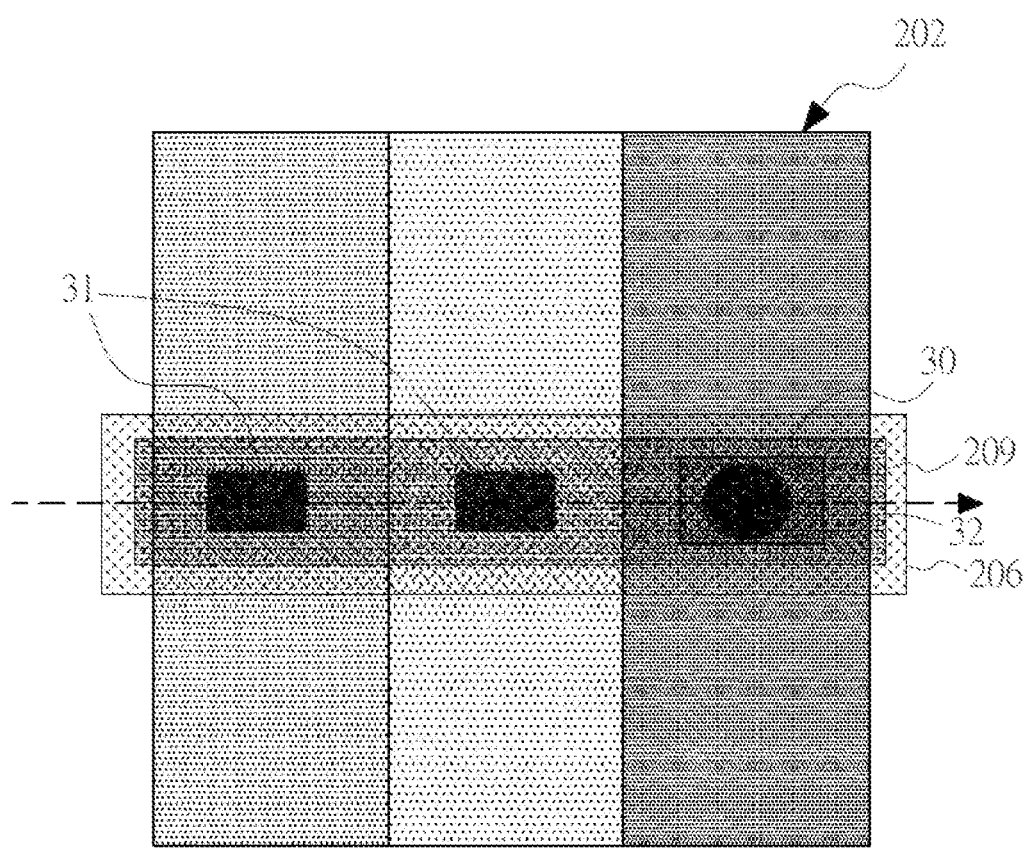
FIG. 2d shows a top view illustrating a photo spacer in a color filter layer according to a manufacturing method of the present invention.

FIG. 2a shows a cross-sectional view illustrating a photoresist dummy bump, wherein a color filter layer is disposed on an active switch array substrate in a liquid crystal display (LCD) according to a manufacturing method of the present invention. FIG. 2b shows a top view illustrating a process of forming a color filter layer according to a manufacturing method of the present invention. FIG. 2c shows a top view illustrating a half tone mask used for a process of forming a color filter layer according to a manufacturing method of the present invention. FIG. 2d shows a top view illustrating a photo spacer in a color filter layer according to a manufacturing method of the present invention. Please refer to FIGS. 2a, 2b, 2c, and 2d, in one embodiment of the present invention, a liquid crystal display panel comprises: an active switch array substrate 10 and an opposite substrate 20. The active switch array substrate 10 includes: a first substrate 100; a first insulation layer 102 disposed on the first substrate 100; a plurality of active switches 208 disposed on the first insulation layer 102; a first planarization layer 104 disposed on the first insulation layer 102 and covering the active switches 208; a color filter layer 202 disposed on the first planarization layer 104, the color filter layer 202 including a first photoresist layer, a second photoresist layer and a third photoresist layer disposed parallel to each other (for example, the color filter layer 202 includes but is not limited to a blue photoresist layer, a green photoresist layer, or a red photoresist layer); a plurality of dummy bumps 32, wherein the dummy bumps 32 are formed on the first photoresist layer and the second photoresist layer (for example, the blue photoresist layer and the green photoresist layer), and the material of the dummy bumps 32 is the same as the third photoresist layer (for example, the red photoresist layer); and a pixel electrode layer 105 disposed on the color filter layer 202 and covering the dummy bumps 32. The opposite substrate 20 is disposed oppositely to the active switch array substrate 10 and includes: a second substrate 200; an indium tin oxide (ITO) electrode layer 204 disposed on the second substrate 200; a black matrix layer 206 disposed on the indium tin oxide electrode layer 204; a plurality of primary photo spacers 30 and a plurality of secondary photo spacers 31 all disposed on the black matrix layer 206, wherein the primary photo spacers 30 correspond to the dummy bumps 32 respectively and contact the pixel electrode layer 105, and the secondary photo spacers 31 do not contact the pixel electrode layer 105, wherein the primary photo spacers 30 and the secondary photo spacers 31 are disposed between the opposite substrate 20 and the active switch array substrate 10 to define a liquid crystal space; and a liquid crystal layer (not shown) disposed between the active switch array substrate 10 and the opposite substrate 20 to fill the liquid crystal space.

In one embodiment of the present invention, the material of the dummy bumps 32 are, for example, a red photoresist layer, a blue photoresist layer, or a green photoresist layer.

In one embodiment of the present invention, the thickness of the dummy bump 32 is preferably 0.5~0.8 um.

In one embodiment of the present invention, the sizes of the primary photo spacers 30 and the secondary photo spacers 31 are uniform.

In one embodiment of the present invention, the heights of the primary photo spacers 30 and the secondary photo spacers 31 are uniform.

Figure 3A:
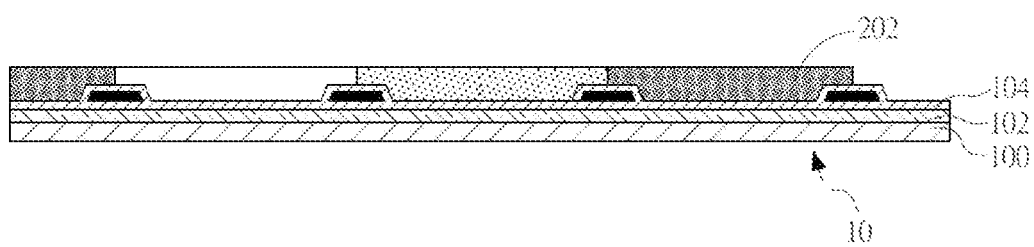
FIG. 3a shows an example of a cross-sectional view illustrating an exposure process of a green photoresist layer and a blue photoresist layer for manufacturing a color filter layer.

FIG. 3a shows an example of a cross-sectional view illustrating an exposure process of a green photoresist layer and a blue photoresist layer for manufacturing a color filter layer. Please refer to FIG. 3a, a manufacturing method of an active switch array substrate 10, comprises: providing a first substrate 100, forming a first insulation layer 102 on the first substrate 100; forming a first planarization layer 104 on the first insulation layer 102; and sequentially forming a plurality of photoresist layers 202 parallel to each other to form a color filter layer, wherein each of the photoresist layers 202 is formed simultaneously (including a green photoresist layer and a blue photoresist layer).

Figure 3B:
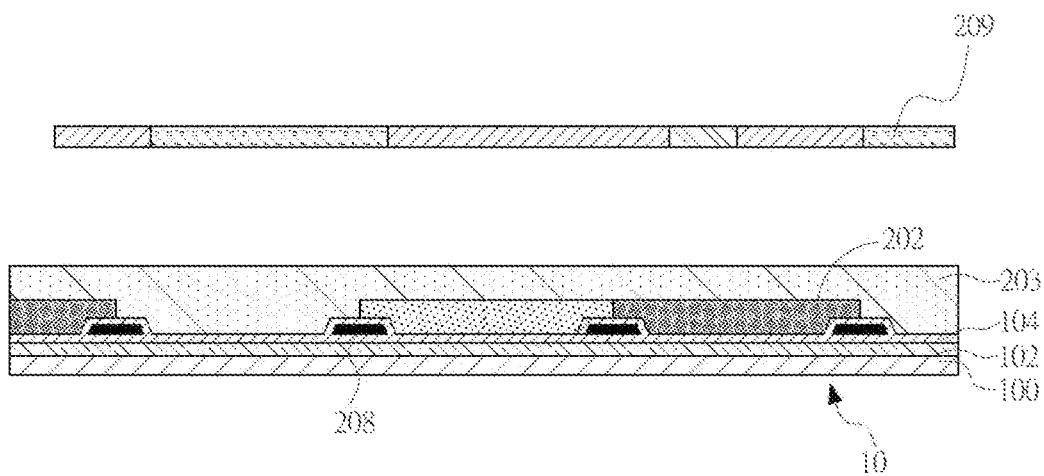
FIG. 3b shows a cross-sectional view illustrating an exposure process of a red photoresist layer using a half-tone photomask for manufacturing a color filter layer according to one embodiment of the present manufacturing method.
Figure 4A:
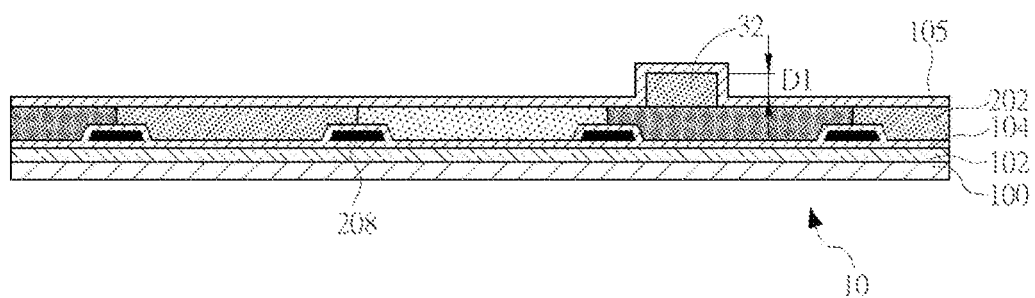
FIG. 4a shows a cross-sectional view illustrating a red photoresist dummy bump, wherein a color filter layer is disposed on an active switch array substrate in a liquid crystal display (LCD) according to a manufacturing method of the present invention.

FIG. 3b shows a cross-sectional view illustrating an exposure process of a red photoresist layer using a half-tone photomask 209 for manufacturing a color filter layer 202 according to one embodiment of the present manufacturing method. FIG. 4a shows a cross-sectional view illustrating a red photoresist dummy bump 32, wherein a color filter layer is disposed on an active switch array substrate 10 according to a manufacturing method of the present invention. Please refer to FIGS. 3b and 4a, in one embodiment of the present invention, an active switch array substrate 10 comprises: a first substrate 100; a first insulation layer 102 disposed on the first substrate 100; a plurality of active switches 208 disposed on the first insulation layer 102; a first planarization layer 104 disposed on the first insulation layer 102 and covering the active switches 208; a color filter layer 202 disposed on the first planarization layer 104, the color filter layer 202 including a plurality of first photoresist layers, second photoresist layers and third photoresist layers (blue photoresist layers, green photoresist layers, and red photoresist layers) parallel to each other; a plurality of dummy bumps 32, wherein the material of the dummy bumps 32 is the same as the material of the third photoresist layers (red photoresist layers) and the dummy bumps 32 are disposed above the first photoresist layers and the second photoresist layers (the blue photoresist layers and the green photoresist layers); and a pixel electrode layer 105 disposed on the color filter layer 202 and covering the dummy bumps 32.

In one embodiment of the present invention, the thickness D1 of the dummy bump 32 is preferably 0.5~0.8 um.

Please continue to refer to FIGS. 3b and 4a, in one embodiment of the present invention, a manufacturing method of an active switch array substrate 10 comprises: providing a first substrate 100; forming a first insulation layer 102 on the first substrate 100; forming a plurality of active switches 208 on the first insulation layer 102; forming a first planarization layer 104 on the first insulation layer 102 and covering the active switches 208; sequentially forming a plurality of a first photoresist layer and a second photoresist layer (a blue photoresist layer and a green photoresist layer) parallel to each other; simultaneously forming a plurality of third photoresist layers (red photoresist layers) 203 and a plurality of dummy bumps 32, wherein the third photoresist layers (the red photoresist layers) 203 are parallel to the first photoresist layers and the second photoresist layers (the blue photoresist layers and the green photoresist layers) to form a color filter layer 202, wherein the material of the dummy bumps 32 is the same as the material of the third photoresist layer (red photoresist layer), and the dummy bumps 32 are disposed above the first photoresist layers and the second photoresist layers (the blue photoresist layers and the green photoresist layers); and forming a pixel electrode layer 105 on the color filter layer 202 and covering the dummy bumps 32.

In one embodiment of the present invention, in the manufacturing method of the active switch array substrate 10, the step of simultaneously forming the third photoresist layers (the red photoresist layers) 203 and a plurality of dummy bumps 32 comprises: forming a photoresist material layer 203 on the first planarization layer 104; forming a photomask 209 on the photoresist material layer 203, wherein the photomask 209 includes a translucent region, an opaque region and a half-translucent region; and performing an exposure process and a development process to form the third photoresist layers (the red photoresist layer) and the dummy bumps 32.

In one embodiment of the present invention, the thickness D1 of the dummy bump 32 is preferably 0.5~0.8 um.

In one embodiment of the present invention, the photomask 209 includes a gray tone photomask or a half tone photomask.

Figure 4B:
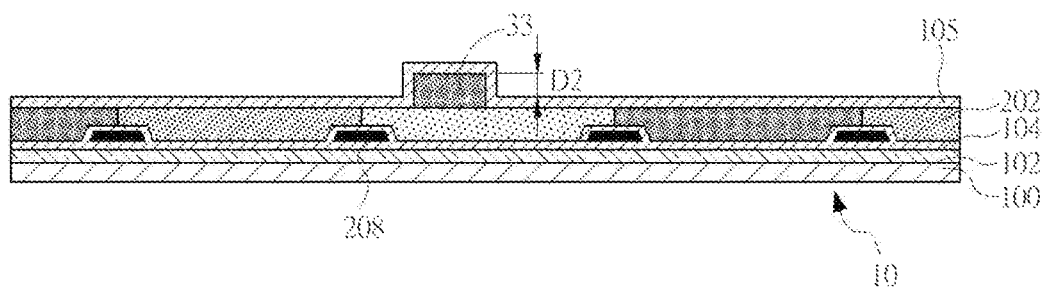
FIG. 4b shows a cross-sectional view illustrating a blue photoresist dummy bump, wherein a color filter layer is disposed on an active switch array substrate in a liquid crystal display (LCD) according to a manufacturing method of the present invention.

FIG. 4b shows a cross-sectional view illustrating a blue photoresist dummy bump 33, wherein a color filter layer is disposed on an active switch array substrate 10 according to a manufacturing method of the present invention. Please refer to FIG. 4b, in one embodiment of the present invention, an active switch array substrate 10 comprises: a first substrate 100; a first insulation layer 102 disposed on the first substrate 100; a plurality of active switches 208 disposed on the first insulation layer 102; a first planarization layer 104 disposed on the first insulation layer 102 and covering the active switches 208; a color filter layer 202 disposed on the first planarization layer 104, the color filter layer 202 including a first photoresist layer, a second photoresist layer and a third photoresist layer (a blue photoresist layer, a green photoresist layer, and a red photoresist layer) parallel to each other; a plurality of dummy bumps 33, wherein the material of the dummy bumps 33 is the same as the material of the first photoresist layers (the blue photoresist layers), and the dummy bumps 33 are disposed above the second photoresist layers and the third photoresist layers (the green photoresist layers and the red photoresist layers); and a pixel electrode layer 105 disposed on the color filter layer 202 and covering the dummy bumps 33.

In one embodiment of the present invention, the thickness D2 of the dummy bump 33 is preferably 0.5~0.8 um.

Please continue to refer to FIG. 4b, in one embodiment of the present invention, a manufacturing method of an active switch array substrate 10 comprises: providing a first substrate 100; forming a first insulation layer 102 on the first substrate 100; forming a plurality of active switches 208 on the first insulation layer 102; forming a first planarization layer 104 on the first insulation layer 102 and covering the active switches 208; sequentially forming a plurality of second photoresist layers and third photoresist layers (for example, green photoresist layers and red photoresist layers) parallel to each other; simultaneously forming a plurality of first photoresist layers (for example, blue photoresist layers) and a plurality of dummy bumps 33, wherein the first photoresist layers (for example, the blue photoresist layers), the second photoresist layers and the third photoresist layers (for example, the green photoresist layers and the red photoresist layers) are parallel to each other to form a color filter layer 202, wherein the material of the dummy bumps 33 is the same as the material of the first photoresist layer (for example, the blue photoresist layer), and the dummy bumps 33 are disposed above the second photoresist layers and the third photoresist layers (for example, the green photoresist layers and the red photoresist layers); and forming a pixel electrode layer 105 on the color filter layer 202 and covering the dummy bumps 33.

In one embodiment of the present invention, in the manufacturing method of the active switch array substrate 10, the step of simultaneously forming the first photoresist layers (the blue photoresist layers) and a plurality of dummy bumps 33 comprises: forming a photoresist material layer (not shown) on the first planarization layer 104; forming a photomask (not shown) on the photoresist material layer 203, wherein the photomask includes a translucent region, an opaque region and a half-translucent region; and performing an exposure process and a development process to form the first photoresist layers (the blue photoresist layer) and the dummy bumps 33.

In one embodiment of the present invention, the thickness D2 of the dummy bump 33 is preferably 0.5~0.8 um.

In one embodiment of the present invention, the photomask 209 includes a gray tone photomask or a half tone photomask.

Figure 4C:
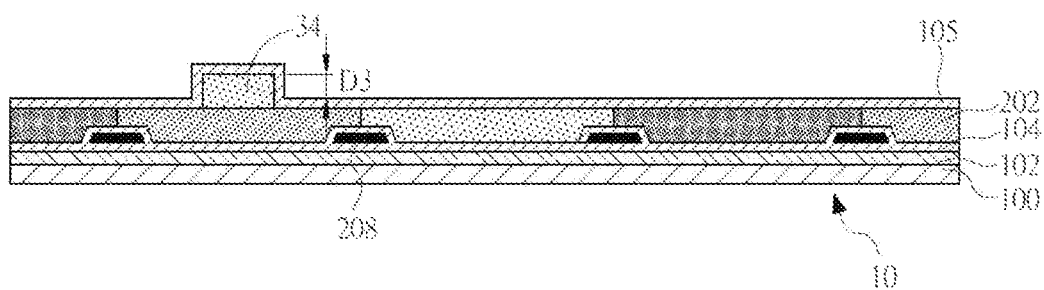
FIG. 4c shows a cross-sectional view illustrating a green photoresist dummy bump, wherein a color filter layer is disposed on an active switch array substrate in a liquid crystal display (LCD) according to a manufacturing method of the present invention.

FIG. 4c shows a cross-sectional view illustrating a green photoresist dummy bump 34, wherein a color filter layer is disposed on an active switch array substrate 10 according to a manufacturing method of the present invention. Please refer to FIG. 4c, in one embodiment of the present invention, an active switch array substrate 10 comprises: a first substrate 100; a first insulation layer 102 disposed on the first substrate 100; a plurality of active switches 208 disposed on the first insulation layer 102; a first planarization layer 104 disposed on the first insulation layer 102 and covering the active switches 208; a color filter layer 202 disposed on the first planarization layer 104, the color filter layer 202 including a first photoresist layer, a second photoresist layer and a third photoresist layer (a blue photoresist layer, a green photoresist layer, and a red photoresist layer) parallel to each other; a plurality of dummy bumps 34, wherein the material of the dummy bumps 34 is the same as the material of the second photoresist layers (the green photoresist layers), and the dummy bumps 34 are disposed above the first photoresist layers and the third photoresist layers (the blue photoresist layers and the red photoresist layers); and a pixel electrode layer 105 disposed on the color filter layer 202 and covering the dummy bumps 34.

In one embodiment of the present invention, the thickness D3 of the dummy bump 34 is preferably 0.5~0.8 um.

Please continue to refer to FIG. 4c, in one embodiment of the present invention, a manufacturing method of an active switch array substrate 10 comprises: providing a first substrate 100; forming a first insulation layer 102 on the first substrate 100; forming a plurality of active switches 208 on the first insulation layer 102; forming a first planarization layer 104 on the first insulation layer 102 and covering the active switches 208; sequentially forming a plurality of first photoresist layers and third photoresist layers (for example, blue photoresist layers and red photoresist layers) parallel to each other; simultaneously forming a plurality of second photoresist layers (for example, green photoresist layers) and a plurality of dummy bumps 34, wherein the second photoresist layers (the green photoresist layers) are parallel to the first photoresist layers and the third photoresist layers (the blue photoresist layers and the red photoresist layers) to form a color filter layer 202, wherein the material of the dummy bumps 34 is the same as the material of the second photoresist layer (for example, the green photoresist layer), and the dummy bumps 34 are disposed above the first photoresist layers and the third photoresist layers (for example, the blue photoresist layers and the red photoresist layers); and forming a pixel electrode layer 105 on the color filter layer 202 and covering the dummy bumps 34.

In one embodiment of the present invention, in the manufacturing method of the active switch array substrate 10, the step of simultaneously forming the second photoresist layers (the green photoresist layers) and a plurality of dummy bumps 34 comprises: forming a photoresist material layer (not shown) on the first planarization layer 104; forming a photomask (not shown) on the photoresist material layer 203, wherein the photomask includes a translucent region, an opaque region and a half-translucent region; and performing an exposure process and a development process to form the second photoresist layers (the green photoresist layer) and the dummy bumps 34.

In one embodiment of the present invention, the thickness D3 of the dummy bump 34 is preferably 0.5~0.8 um.

In one embodiment of the present invention, the photomask includes a gray tone photomask or a half tone photomask.

In one embodiment of the present invention, a multi-tone photomask includes a gray-tone photomask and a half-tone photomask. The gray-tone photomask can be used for manufacturing a slit with a scale below a resolution of an exposure machine. The slit can be used for achieving a half-exposure effect by covering part of a light passing through the slit. On the other hand, a principle of a half-tone photomask is using a semi-permeable membrane to perform a half-exposure process. Both of the above-mentioned two photomasks can generate three exposure levels of "partial-exposure", "half-exposure" and "no exposure" after one exposure process step, so that photoresist layers with two heights or thicknesses could be formed after development process. The present invention can use fewer photoresist layers to pattern a display panel and improve a manufacturing efficiency by way of different heights of photoresist layers. It is noted that a cost of the half-tone photomask is slightly higher than a cost of the gray-tone photomask.

The advantages of the present invention include increasing an amount of liquid crystals and decreasing a brightness uneven phenomenon of in a liquid crystal display (LCD) apparatus. The brightness uneven phenomenon will result in a variety of blemish and clouding image effects.

"In some embodiments of the present invention" and "In a variety of embodiments of the present invention" are used repeatedly through the description. They usually mean different embodiments. However, they can also mean the same embodiments. "Comprising", "having" and "including" are synonyms, except it is noted to be different or has other meanings before and after its description.

The present invention has been described in considerable detail with reference to certain preferred embodiments thereof. It should be understood that the description is for illustrative purpose, not for limiting the scope of the present invention. Those skilled in this art can readily conceive simple or equivalent variations and modifications, which are still within the spirit of the present invention.

What is claimed is:

1. An active switch array substrate, comprising:
   a first substrate;
   a first insulation layer disposed on the first substrate;
   a plurality of active switches disposed on the first insulation layer;
   a first planarization layer disposed on the first insulation layer and covering the active switches;
   a color filter layer disposed on the first planarization layer, the color filter layer including a plurality of first photoresist layers, second photoresist layers and third photoresist layers parallel to each other;
   a plurality of dummy bumps, wherein a material of the dummy bumps is the same as a material of the third photoresist layers, and the dummy bumps are disposed above one of the first photoresist layers and the second photoresist layers; and
   a pixel electrode layer disposed on the color filter layer and covering the dummy bumps;
   wherein the dummy bumps correspond to primary photo spacers of an opposite substrate respectively, and the sizes of the dummy bumps are bigger than the sizes of the primary photo spacers; and
   the dummy bumps do not contact the third photoresist layers.

2. The active switch array substrate according to claim 1, wherein the material of the dummy bumps includes a red photoresist layer.

3. The active switch array substrate according to claim 1, wherein the material of the dummy bumps includes a green photoresist layer.

4. The active switch array substrate according to claim 1, wherein the material of the dummy bumps includes a blue photoresist layer.

5. The active switch array substrate according to claim 1, wherein a thickness of the dummy bump is 0.5~0.8 um.

6. A manufacturing method of an active switch array substrate, comprising steps of:
   providing a first substrate;
   forming a first insulation layer on the first substrate;
   forming a plurality of active switches on the first insulation layer;
   forming a first planarization layer on the first insulation layer and covering the active switches;
   sequentially forming a plurality of first photoresist layers and second photoresist layers parallel to each other;
   simultaneously forming a plurality of third photoresist layers and a plurality of dummy bumps, wherein the third photoresist layers are parallel to the first photoresist layers and the second photoresist layers to form a color filter layer, wherein a material of the dummy bumps is the same as a material of the third photoresist layers, and the dummy bumps are disposed above one of the first photoresist layers and the second photoresist layers; and
   forming a pixel electrode layer on the color filter layer and covering the dummy bumps;
   wherein the dummy bumps correspond to primary photo spacers of an opposite substrate respectively, and the sizes of the dummy bumps are bigger than the sizes of the primary photo spacers; and
   the dummy bumps do not contact the third photoresist layers.

7. The method of manufacturing the active switch array substrate according to claim 6, wherein the step of simultaneously forming a plurality of third photoresist layers and a plurality of dummy bumps comprises:
   forming a photoresist material layer on the first planarization layer;
   forming a photomask on the photoresist material layer, the photomask having a translucent region, an opaque region and a half-translucent region; and
   performing an exposure process and a development process to form the third photoresist layers and the dummy bumps.

8. The method of manufacturing the active switch array substrate according to claim 7, wherein the photomask includes one of a gray-tone photomask and a half-tone photomask.

9. A liquid crystal display panel comprising:
   an active switch array substrate comprising:
      a first substrate;
      a first insulation layer disposed on first substrate;
      a plurality of active switches disposed on the first insulation layer;
      a first planarization layer disposed on the first insulation layer and covering the active switches;
      a color filter layer disposed on the first planarization layer, the color filter layer including a plurality of first photoresist layers, second photoresist layers and third photoresist layers parallel to each other;
      a plurality of dummy bumps, wherein a material of the dummy bumps is the same as a material of the third photoresist layers, and the dummy bumps are disposed above one of the first photoresist layers and the second photoresist layers; and
      a pixel electrode layer disposed on the color filter layer and covering the dummy bumps; and
   an opposite substrate disposed oppositely to the active switch array substrate comprising:
      a second substrate;
      an indium tin oxide electrode layer disposed on the second substrate;
      a black matrix layer disposed on the indium tin oxide electrode layer; and
      a plurality of primary photo spacers and secondary photo spacers disposed on the black matrix layer, wherein the primary photo spacers contact the pixel electrode layer, and the secondary photo spacers do not contact the pixel electrode layer, wherein the primary photo spacers and the secondary photo spacers are disposed between the opposite substrate and the active switch array substrate to define a liquid crystal space; and
   a liquid crystal layer disposed between the active switch array substrate and the opposite substrate to fill the liquid crystal space;
   wherein the dummy bumps correspond to the primary photo spacers respectively, and the sizes of the dummy bumps are bigger than the sizes of the primary photo spacers; and
   the dummy bumps do not contact the third photoresist layers.

10. The liquid crystal display panel according to claim 9, wherein the material of the dummy bump includes a red photoresist layer.

11. The liquid crystal display panel according to claim 9, wherein the material of the dummy bump includes a green photoresist layer.

12. The liquid crystal display panel according to claim 9, wherein the material of the dummy bump includes a blue photoresist layer.

13. The liquid crystal display panel according to claim 9, wherein a thickness of the dummy bump is 0.5~0.8 um.

14. The liquid crystal display panel according to claim 9, wherein the sizes of the primary photo spacers are uniform.

15. The liquid crystal display panel according to claim 9, wherein the heights of the primary photo spacers are uniform.

16. The liquid crystal display panel according to claim 9, wherein the sizes of the secondary photo spacers are uniform.

17. The liquid crystal display panel according to claim 9, wherein the heights of the secondary photo spacers are uniform.

* * * * *